US010410671B2

(12) United States Patent
Takasu et al.

(10) Patent No.: US 10,410,671 B2
(45) Date of Patent: Sep. 10, 2019

(54) APPARATUS AND METHOD FOR RECORDING AND ERASING USER DATA ON A RECORDABLE OPTICAL DISC

(71) Applicant: Panasonic Intellectual Property Management Co., Ltd., Osaka (JP)

(72) Inventors: Toshiaki Takasu, Osaka (JP); Takeharu Yamamoto, Osaka (JP); Akinori Yuba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/108,721

(22) Filed: Aug. 22, 2018

(65) Prior Publication Data

US 2019/0066726 A1 Feb. 28, 2019

(30) Foreign Application Priority Data

Aug. 22, 2017 (JP) ................. 2017-159507

(51) Int. Cl.
*G11B 20/20* (2006.01)
*G11B 20/00* (2006.01)
*G11B 20/10* (2006.01)
*G11B 20/12* (2006.01)
(Continued)

(52) U.S. Cl.
CPC .... *G11B 20/00108* (2013.01); *G11B 20/0013* (2013.01); *G11B 20/10* (2013.01); *G11B 20/1217* (2013.01); *G11B 27/00* (2013.01); *G11B 27/329* (2013.01); *G11B 2020/10851* (2013.01); *G11B 2020/10861* (2013.01);
(Continued)

(58) Field of Classification Search
None
See application file for complete search history.

(56) References Cited

U.S. PATENT DOCUMENTS

| 6,580,647 B1* | 6/2003 | Yokota | G11C 7/16 365/185.33 |
| 8,122,182 B2* | 2/2012 | Powell | G06F 12/0875 711/103 |
| 10,068,604 B2* | 9/2018 | Miyashita | G11B 7/0055 |

(Continued)

FOREIGN PATENT DOCUMENTS

JP  2017-33621  2/2017

*Primary Examiner* — Tan X Dinh
(74) *Attorney, Agent, or Firm* — Wenderoth, Lind & Ponack, L.L.P.

(57) ABSTRACT

An information recording apparatus includes: a first memory which stores synchronization data for updating data on a recordable optical disc and/or adding data to the recordable optical disc; a second memory which stores erasure information indicating data to be erased; and a controller which controls addition, update, and erasure of data on the optical disc. The controller records the synchronization data onto the optical disc. After recording the synchronization data, the controller records, onto the optical disc, management information indicating the state of the optical disc on which the synchronization data has been recorded and the state of the optical disc resulting from erasure according to the erasure information. Subsequently, the controller closes the session. After closing the session, the controller physically erases the data to be erased which has been recorded on the optical disc.

6 Claims, 18 Drawing Sheets

(51) Int. Cl.
*G11B 27/32* (2006.01)
*G11B 27/00* (2006.01)
(52) U.S. Cl.
CPC ............... *G11B 2020/1235* (2013.01); *G11B 2020/1289* (2013.01)

(56) References Cited

U.S. PATENT DOCUMENTS

| | | | |
|---|---|---|---|
| 2006/0053249 A1* | 3/2006 | Yamaki | G11B 20/10 711/112 |
| 2012/0110249 A1* | 5/2012 | Jeong | G06F 3/0616 711/103 |
| 2017/0031960 A1* | 2/2017 | Takasu | G06F 3/0677 |
| 2017/0097789 A1* | 4/2017 | Takasu | G06F 3/0604 |

* cited by examiner

FIG. 3

Erasure list
33

| File ID | File name | Path |
|---------|-----------|------|
| 001 | A.txt | ¥¥AA¥A.txt |
| 002 | B.bin | ¥¥BB¥B.bin |
| 003 | C.Sh | ¥¥CC¥C.sh |
| 004 | C.1.sh | ¥¥C¥YY¥C.1.sh |
| 005 | D.Txt | ¥¥DD¥D.txt |
| ... | ... | ... |

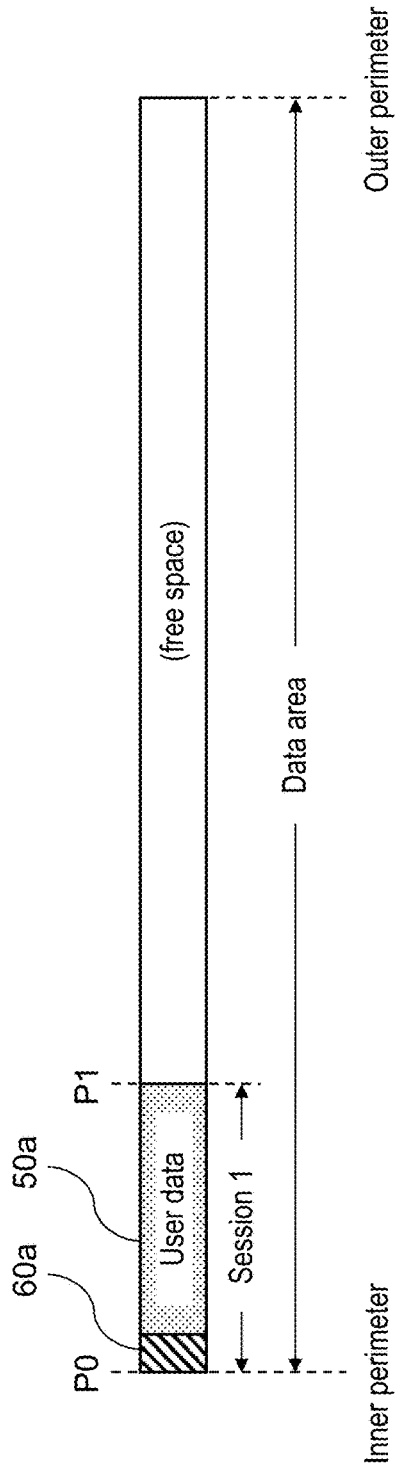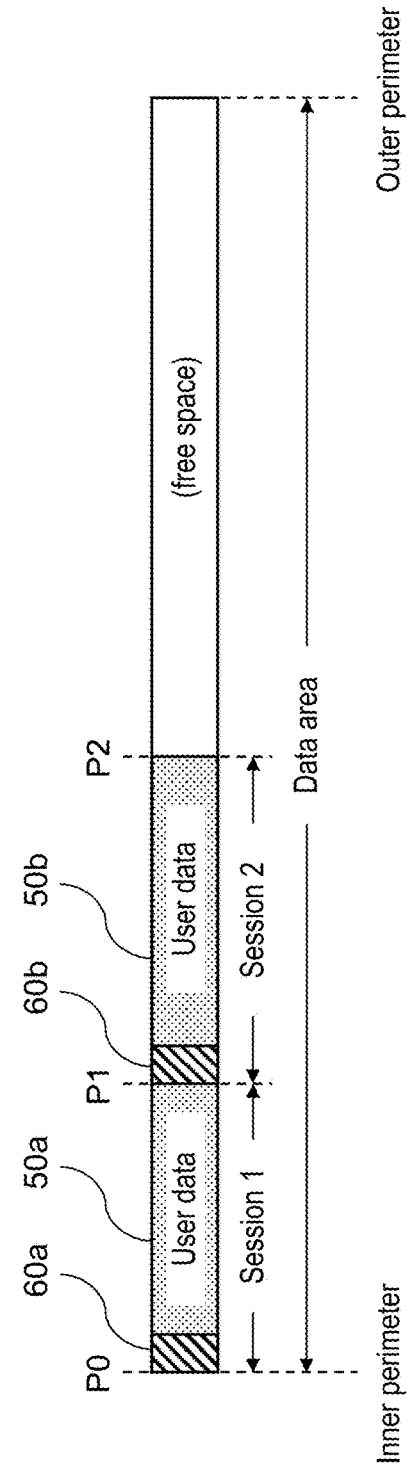

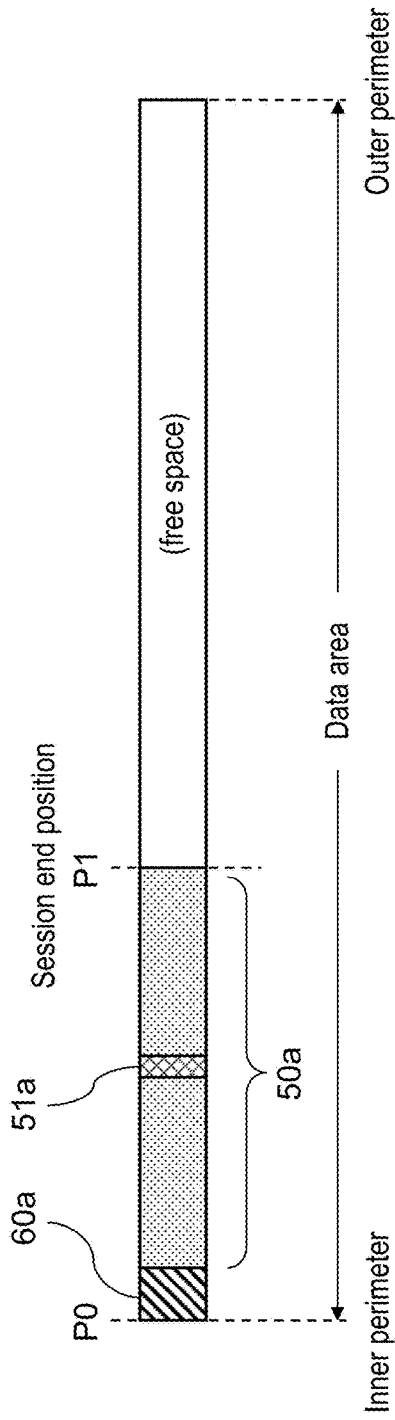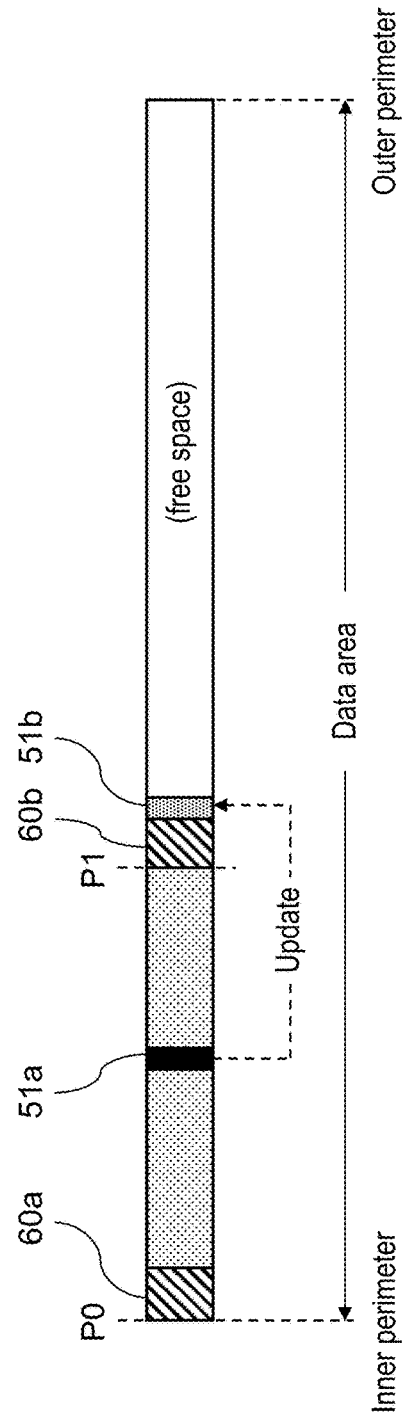

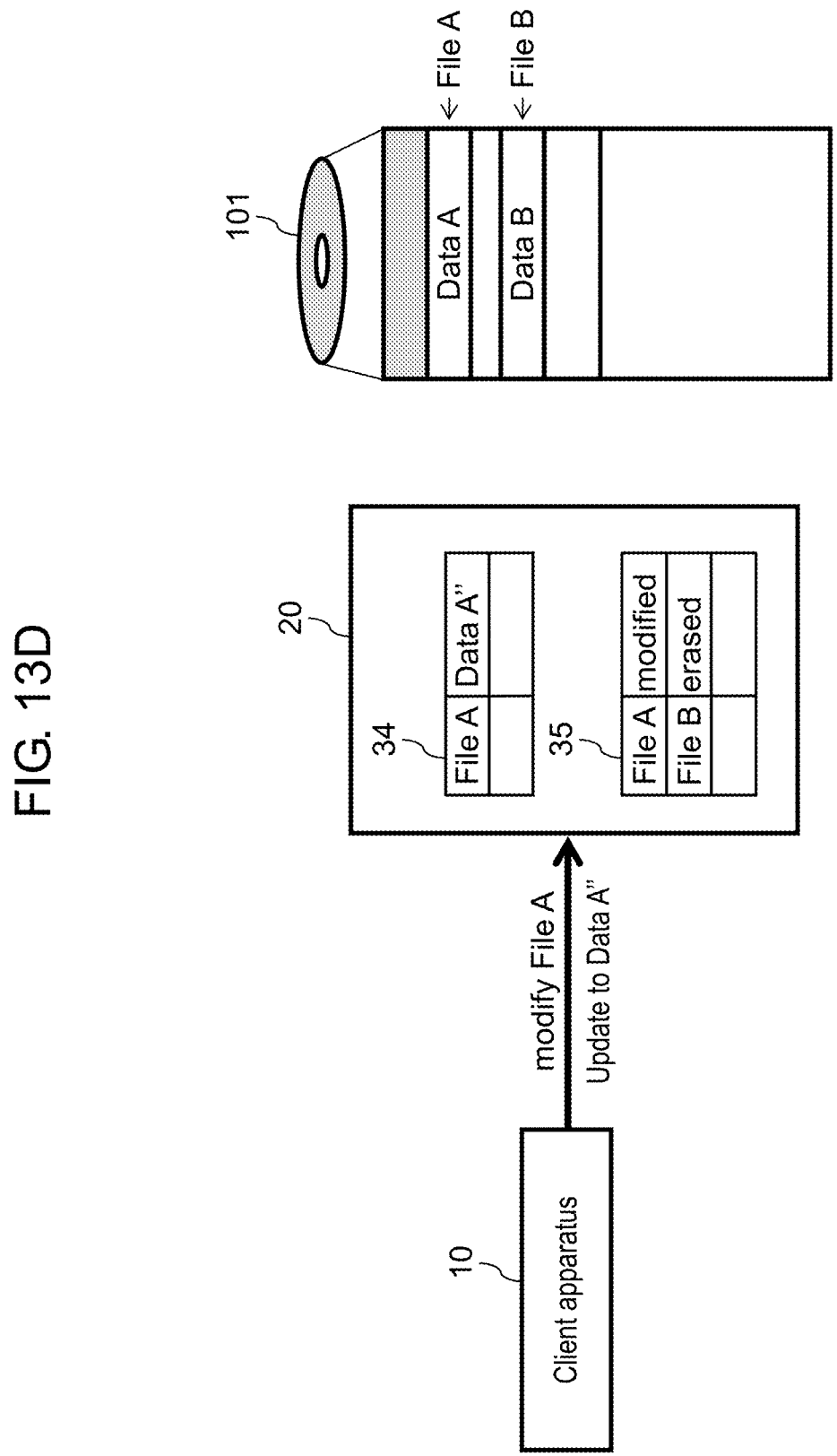

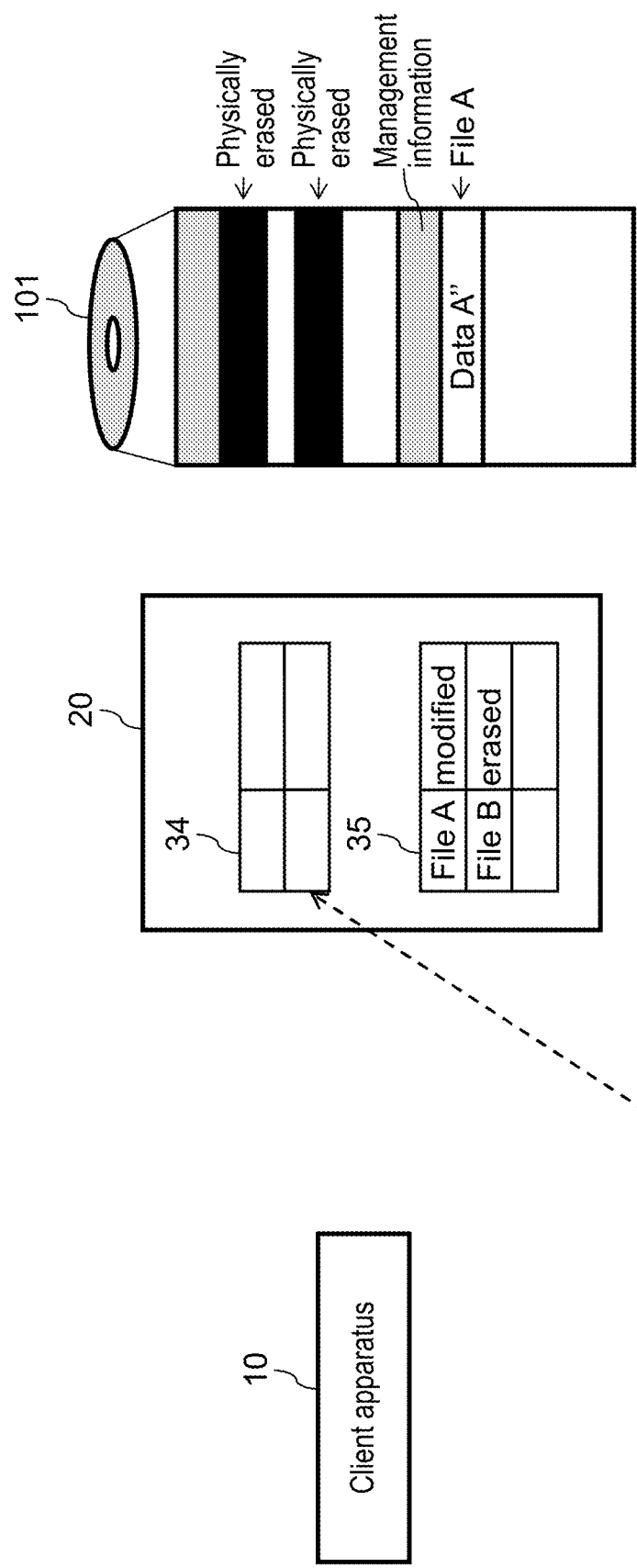

APPARATUS AND METHOD FOR RECORDING AND ERASING USER DATA ON A RECORDABLE OPTICAL DISC

BACKGROUND

1. Technical Field

The present disclosure relates to a method and apparatus for erasing data recorded on a recordable optical disc.

2. Description of the Related Art

Recordable optical discs such as digital versatile discs recordable (DVD-R) and Blu-ray discs recordable (BD-R) are recording media on which recording marks that have been recorded once are not rewritable. Unexamined Japanese Patent Publication No. 2017-033621 discloses an information recording and reproducing apparatus which erases data recorded on a recordable optical disc.

The information recording and reproducing apparatus disclosed in Unexamined Japanese Patent Publication No. 2017-033621 includes: a memory storing a database for managing data recorded on an optical disc and history data related to said data; and a controller which controls data recording, update, and erasure on the optical disc. The history data is data that has not yet been updated in the case where data recorded on the optical disc is updated. When erasing subject data recorded on the optical disc, the controller determines whether or not there is at least one piece of history data related to the subject data, and when there is at least one piece of history data related to the subject data, erases, on the optical disc, the subject data and the history data related to the subject data. With this configuration, not only data to be erased, but also history data related thereto, are automatically detected and erased. This improves user convenience in the erasure process.

SUMMARY

One aspect of the present disclosure is an information recording apparatus capable of erasing user data recorded on a recordable optical disc. The information recording apparatus includes: a first memory which stores synchronization data for updating user data on the optical disc and/or adding user data to the optical disc; a second memory which stores erasure information indicating user data to be erased; and a controller which controls addition, update, and erasure of user data on the optical disc. The controller records the synchronization data onto the optical disc. After recording the synchronization data, the controller records, onto the optical disc, management information indicating the state of the optical disc on which the synchronization data has been recorded and the state of the optical disc resulting from erasure according to the erasure information. Subsequently, the controller closes the session. After closing the session, the controller physically erases the data to be erased which has been recorded on the optical disc.

One aspect of the present disclosure is a data erasure method for erasing user data recorded on a recordable optical disc. According to the data erasure method, synchronization data for updating user data on the optical disc and/or adding user data to the optical disc is generated, and erasure information indicating user data to be erased is generated. Furthermore, the synchronization data is recorded onto the optical disc. After the synchronization data is recorded, management information indicating the state of the optical disc on which the synchronization data has been recorded and the state of the optical disc resulting from erasure according to the erasure information is recorded onto the optical disc. Subsequently, the session is closed. After the session is closed, the data to be erased which has been recorded on the optical disc is physically erased.

According to the information recording apparatus and the erasure method in the present disclosure, after a session is closed, the process of physically erasing data is performed on data to be erased. Thus, even when an erasure operation is interrupted due to malfunctioning of a drive during physical data erasure, the subsequent recording and reproducing operations for the optical disc are possible because the session has been closed.

BRIEF DESCRIPTION OF DRAWINGS

FIG. 3 illustrates an example of an erasure list;

FIGS. 6A and 6B illustrate recording of management information and user data onto an optical disc;

FIGS. 8A and 8B illustrate a change in the state of a disc during file update;

FIG. 13D illustrates an example of an operation responding to input for updating user data corresponding to a file already held in a cache;

FIG. 13G illustrates an operation associated with physical erasure.

DETAILED DESCRIPTION

Hereinafter, exemplary embodiments will be described in detail with reference to the drawings as necessary. However, there are instances where overly detailed description is omitted. For example, detailed description of well-known matter, overlapping description of substantially identical elements, etc., may be omitted. This is to prevent the subsequent description from becoming unnecessarily redundant, and thus facilitate understanding by a person having ordinary skill in the art.

Note that the inventor(s) provides the accompanying drawings and the subsequent description so that a person having ordinary skill in the art is able to sufficiently understand the present disclosure, and is not intended to limit the scope of the subject matter recited in the claims.

First Exemplary Embodiment

[1-1. Configuration]

[1-1-1. Information Recording System]

Figure 1:
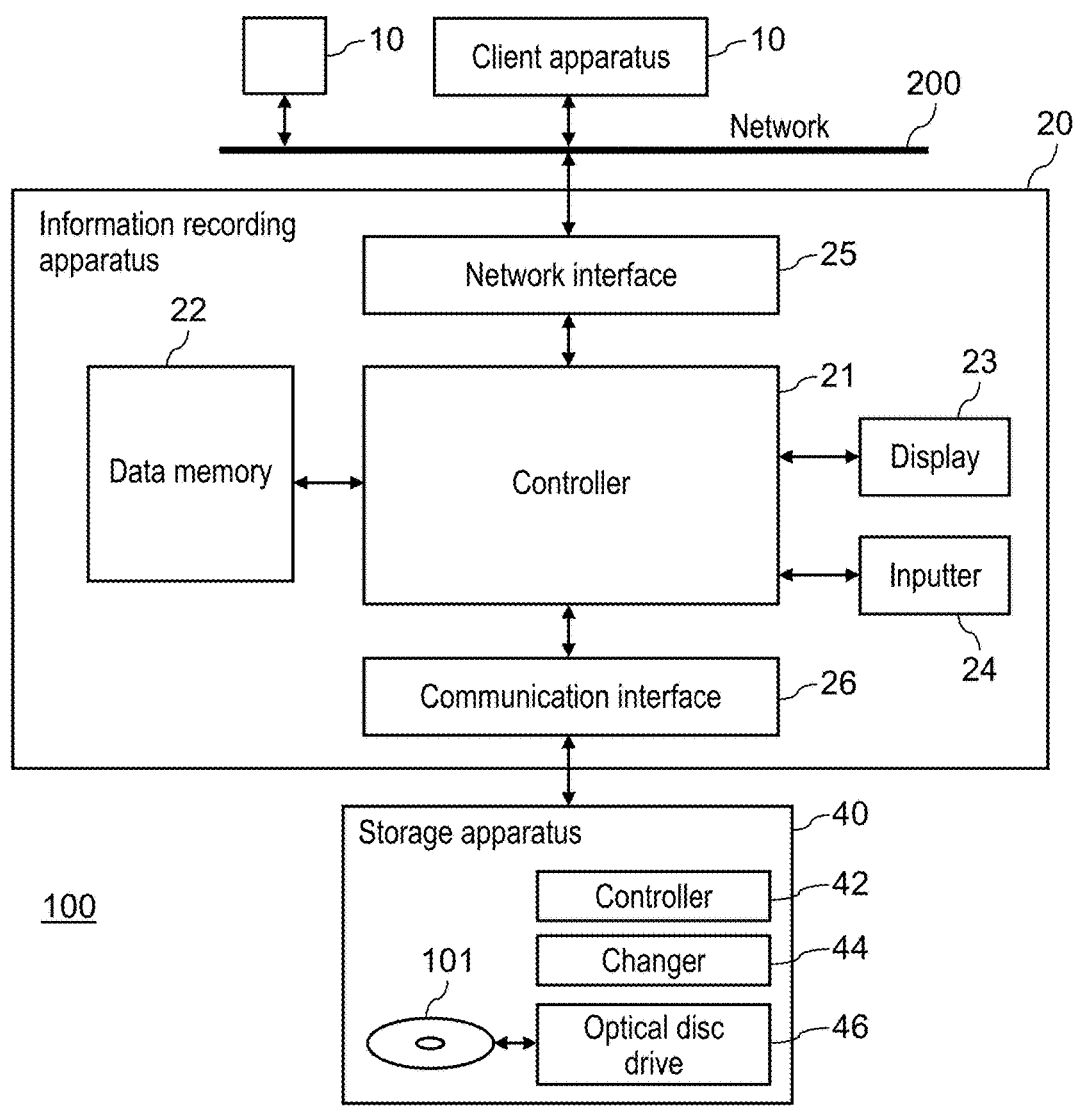
FIG. 1 is a hardware configuration diagram of an information recording apparatus according to the present exemplary embodiment.

FIG. 1 illustrates a configuration of information recording system 100 according to the present exemplary embodiment. In FIG. 1, information recording system 100 includes information recording apparatus 20 and storage apparatus 40. The information recording system 100 is connected to client apparatus 10 via network 200.

Client apparatus 10 is a computer which uses functions, data, etc., provided by information recording system 100 according to input from a user. According to the user input, client apparatus 10 issues various commands to information recording system 100. For example, client apparatus 10 issues a command for recording a file (user data) to storage apparatus 40, a command for reading a file recorded on storage apparatus 40, and a command for erasing a file recorded on storage apparatus 40.

Information recording apparatus 20 records data onto a recording medium (optical disc) in storage apparatus 40 or reads data from the recording medium, for example, by controlling storage apparatus 40 according to the command received from client apparatus 10.

Information recording apparatus 20 includes: controller 21 which controls the whole operation of information recording apparatus 20; display 23 which displays various information; inputter 24 which receives user input; and data memory 22 in which data and a program are stored. Furthermore, information recording apparatus 20 includes: communication interface 26 which allows connection of an external device; and network interface 25 which allows connection to network 200.

Display 23 is, for example, a liquid-crystal display or an organic electroluminescent (EL) display. Inputter 24 includes various members which are operated by a user such as a keyboard, a mouse, a touch pad, a touch panel, and a button.

Communication interface 26 is a circuit (module) for connecting storage apparatus 40 to information recording apparatus 20. Communication interface 26 performs communication in accordance with communication standards such as serial attached SCSI (SAS).

Network interface 25 is a circuit (module) for connecting information recording apparatus 20 to a network, for example, a local area network (LAN) or a wide area network (WAN), via a wired or wireless communication line. Network interface 25 performs communication complying with communication standards such as IEEE802.3, IEEE802.11a/11b/11g/11ac, and WiFi.

Data memory 22 is a recording medium which stores a parameter, data, a control program, and the like necessary for providing a predetermined function, and is in the form of hard disk drive (HDD). Data memory 22 may be in the form of a solid-state device (SSD). As described later, data memory 22 operates as a memory which stores erasure list 33 (refer to FIG. 2) and cache 34 (refer to FIG. 2) which temporarily stores data to be recorded onto optical disc 101 and data read from optical disc 101.

Controller 21 includes a central processing unit (CPU) or a microprocessor (MPU) and provides a predetermined function by executing a control program (software). The control program is stored, for example, in data memory 22 or read-only memory (ROM) (not illustrated in the drawings).

Furthermore, information recording apparatus 20 includes random-access memory (RAM) (not illustrated in the drawings) including a semiconductor device such as dynamic random-access memory (DRAM) or static random-access memory (SRAM). The RAM temporarily stores data and functions as a working area for controller 21.

Storage apparatus 40 stores optical disc 101, which is a recording medium, and records and reproduces data on optical disc 101 according to a control of information recording apparatus 20. Storage apparatus 40 includes controller 42, changer 44, and optical disc drive 46 Controller 42 controls the whole operation of storage apparatus 40. Controller 42 includes CPU or MPU and provides a predetermined function by executing a control program (software). Alternatively, the functions of controller 42 may be provided by controller 21. Optical disc drive 46 writes data onto optical disc 101 and reads data from optical disc 101. Changer 44 loads optical disc 101 into optical disc drive 46. Optical disc 101 is a recordable optical disc such as DVD-R or BD-R.

Figure 2:
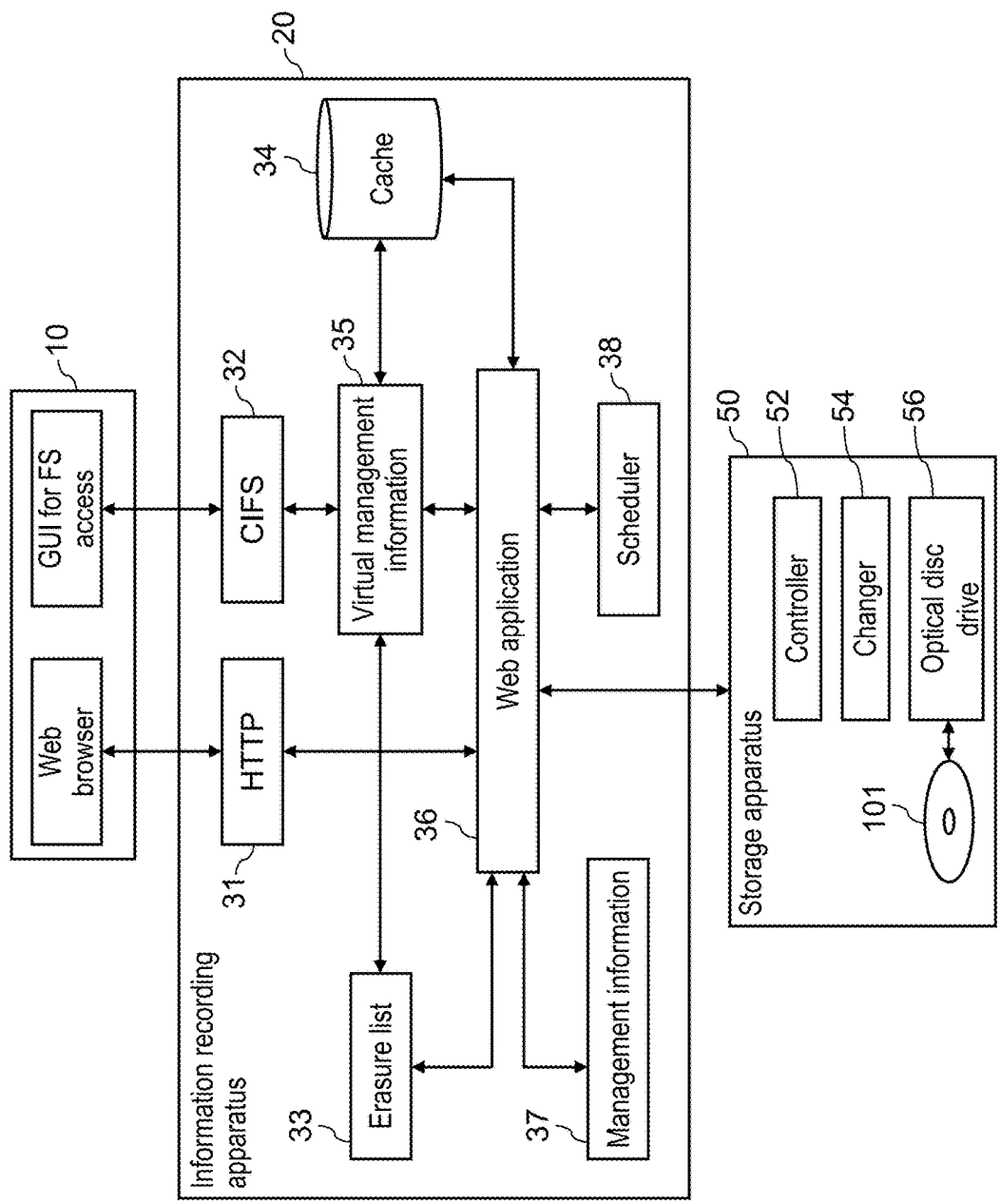
FIG. 2 is a function configuration diagram of an information recording apparatus according to the present exemplary embodiment.

FIG. 2 illustrates a function configuration of information recording apparatus 20 according to the present exemplary embodiment. Each element (function) of information recording apparatus 20 illustrated in FIG. 2 is provided by controller 21 executing a control program.

Client apparatus 10 receives user input through a Web browser, such as the Internet Explorer developed by Microsoft Corporation, as a graphical user interface (GUI). A user can input (instruct) recording, transfer, and/or reproduction of user data on optical disc 101 to information recording system 100 via such GUI. In this case, client apparatus 10 transmits information based on the hypertext transfer protocol (HTTP) to information recording system 100. Furthermore, client apparatus 10 can instruct data recording, erasure, etc., to information recording system 100 (optical disc 101) using a user interface (GUI) for file system (FS) access. In this case, client apparatus 10 transmits a command based on a common internet file system (CIFS) or a network file system (NFS) to information recording apparatus 20.

HTTP module 31 is a function which receives the information transmitted from client apparatus 10 according to the HTTP protocol. CIFS module 32 is a function which receives the command, data, etc., based on the CIFS from client apparatus 10. For example, an erasure command for erasing a file may be received via HTTP module 31, and a command for updating (rewriting) a file may be received via CIFS module 32. In the case of using the NFS, the same or similar functions are obtained by replacing CIFS module 32 with an NFS module.

Cache 34 is a means which temporarily stores data to be written onto optical disc 101. Cache 34 is provided using data memory 22.

Virtual management information 35 is a file system which manages a virtual state of a file when the data stored in cache 34 is reflected in optical disc 101. In other words, virtual management information 35 is a file system which logically manages the state of a file on optical disc 101 that is to be modified according to an instruction from client apparatus 10, but has not yet been actually modified.

In contrast, management information 37 is a file system which manages the file (data) recorded on optical disc 101 loaded in optical disc drive 46. In other words, management information 37 indicates an actual state of a file (data) on optical disc 101. By referring to management information 37, information recording apparatus 20 can recognize the position of data recorded on optical disc 101 and the position of the terminal end of a data recorded area. Virtual management information 35 and management information 37 are for managing the file recorded on optical disc 101 in accordance with the ISO 9660 standard as described later (details will be described later).

Web application 36 is a function which provides a main operation of information recording apparatus 20, which will be described later.

Scheduler 38 is a function which performs a file synchronization process (details will be described later) on optical disc 101 according to a schedule. The schedule is set, for example, by a manager. In the schedule, a time slot (start and end points in time) in which the synchronization process is performed on optical disc 101 is set. In accordance with the set schedule, a synchronization process for reflecting, in optical disc 101, virtual management information 35 and the data stored in cache 34 is performed on optical disc 101. Information recording apparatus 20 according to the present exemplary embodiment performs a file physical erasure process after this synchronization process.

Erasure list 33 (one example of erasure information) is for managing a file to be erased. FIG. 3 illustrates a configuration example of erasure list 33. Erasure list 33 is for managing a file ID, a file name, and a path indicating a file storage location, of a file to be erased.

[1-1-2. Optical Disc]

Figure 4:
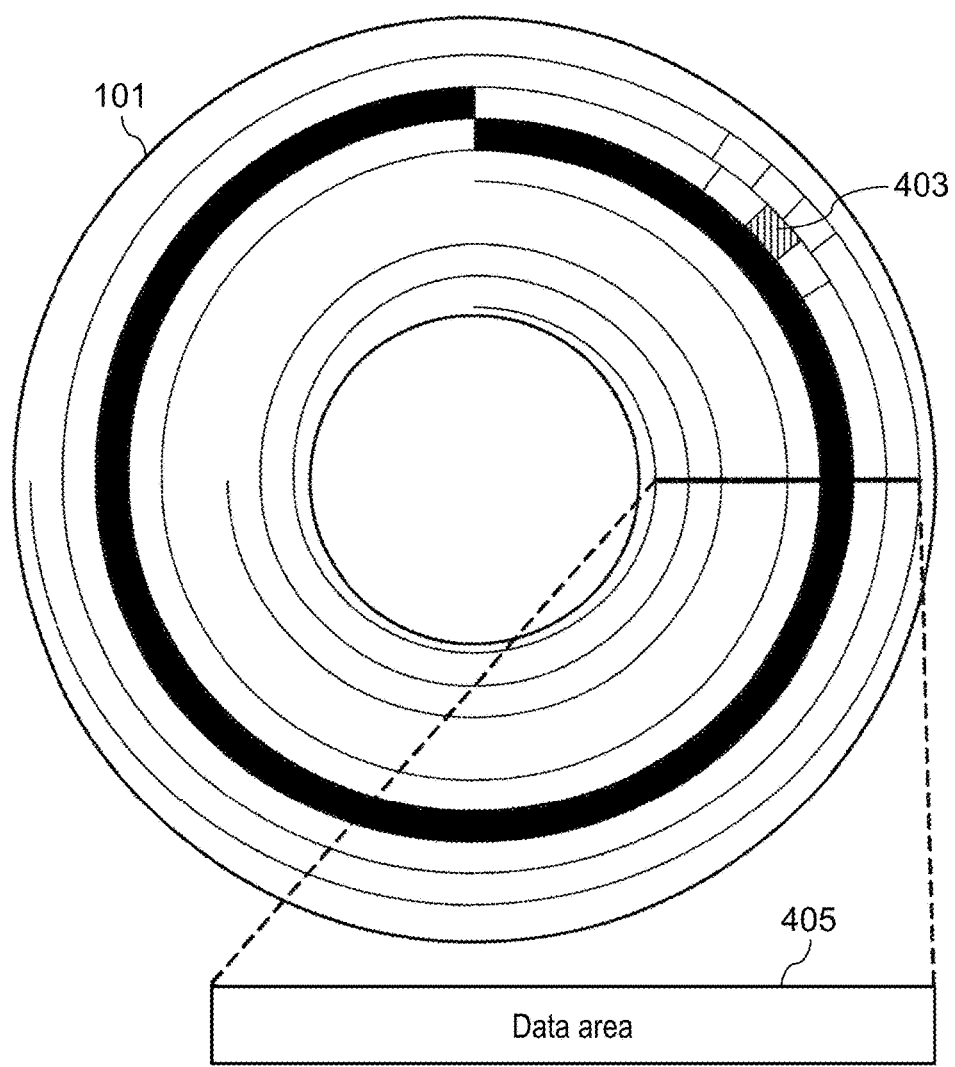
FIG. 4 illustrates a recording area of an optical disc.

Optical disc 101 according to the present exemplary embodiment is a recordable recording medium. FIG. 4 illustrates a logical configuration (area) of optical disc 101. Optical disc 101, which has the shape of a circular plate, includes at least one recording layer on which information can be recorded and reproduced. This recording layer includes: grooves (pits) formed spirally from the center; and physical tracks in either the grooves (pits) or lands (areas between the grooves). Each of the physical tracks includes a plurality of finely divided blocks 403. The grooves (pits) of the physical tracks are formed by wobbling which includes address information (physical address) indicating a specific position on the disc. Note that the physical tracks may be provided on both the grooves and the lands to record information so that the recording density improves.

The width (track pitch) of each of the physical tracks is 0.32 μm, for example, on a Blu-ray disc (BD) (registered trademark).

Block 403 is a unit of error correction and is the minimum unit of data on which recording and reproduction operations are performed. The size of block 403 is 32 Kbyte on a DVD (registered trademark) and 64 Kbyte (=1 cluster) on a BD, for example. When a sector (2 Kbyte), which is the minimum unit of data on optical disc 101, is used as notation, 1 cluster equals 32 sectors. Note that "cluster" and "block" will be hereinafter used with the same meaning.

Figure 5:
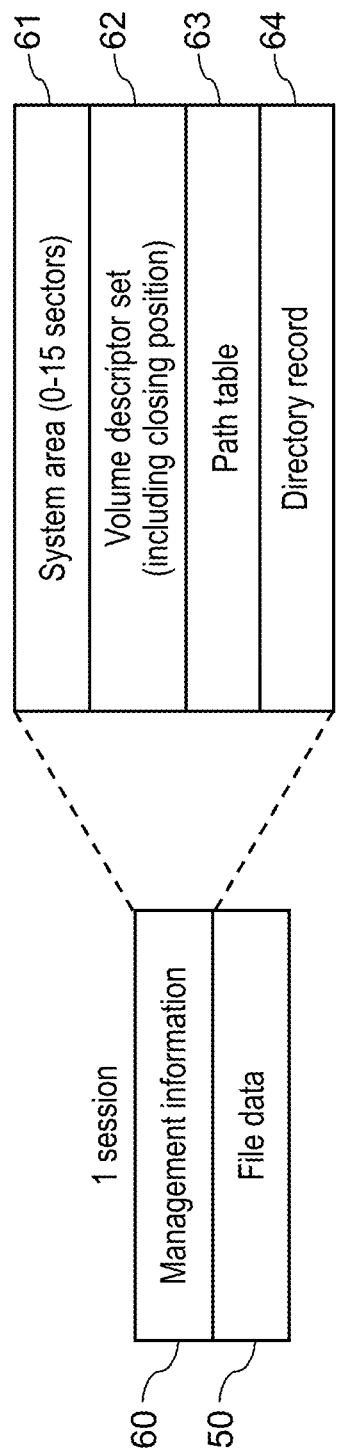
FIG. 5 illustrates management information.

Optical disc 101 includes data area 405 formed spirally from the inner perimeter toward the outer perimeter. Data is continuously recorded in this data area 405 from the inner perimeter toward the outer perimeter. In optical disc 101 according to the present exemplary embodiment, data is recorded in compliance with the ISO 9660 format. Specifically, in data area 405, management information 60 for managing the file recorded on optical disc 101 and file data (hereinafter referred to as "user data") 50 are recorded in each session, as illustrated in FIG. 5.

Management information 60 includes system area 61, volume descriptor set 62, path table 63, and directory record 64. System area 61 is a 16-sector region from the beginning and is prepared for the system. Volume descriptor 62 holds volume-related information (such as a volume or creator name, the position of path table 63 or a root directory, and boot information). Path table 63 is a table in which information of the entire directory in the volume (such as a directory name, a directory position, and a parent directory) is arranged in the breadth first search order. Directory record 64 holds information about a file, a subdirectory, and the like (such as a file name, a file position, and a size), as in a general file system.

[1-2. Operations]

Operations of information recording system 100 having the above-described configuration will be described. When receiving user input for recording, reproduction, etc., of a file on information recording system 100, client apparatus 10 transmits, to information recording apparatus 20, information (hereinafter referred to as a "command") indicating said input. Information recording apparatus 20 in information recording system 100 receives the command from client apparatus 10. According to the received command, controller 21 in information recording apparatus 20 provides an instruction to storage apparatus 40. Storage apparatus 40 (controller 42) records, reproduces, etc., data on optical disc 101 according to the instruction from information recording apparatus 20.

[1-2-1. Recording of Management Information and User Data]

With reference to FIGS. 6A and 6B, recording the management information and the user data onto optical disc 101 will be described.

In the case of recording the user data onto optical disc 101 first, management information 60a for managing the user data (file set) to be recorded onto optical disc 101 is recorded in an area starting from lead position P0 of a data area of optical disc 101, as illustrated in FIG. 6A. Subsequently, user data 50a (including data of at least one file) is recorded in an area continuing from the area in which management information 60a is recorded. When recording of user data 50a is completed, information indicating position P1 of the terminal end of the data recorded area on optical disc 101 (hereinafter referred to as a "session end position") is recorded in management information 60a. In the case of FIG. 6A, the information indicating position P1 of the terminal end of the area in which management information 60a and user data 50a have been recorded is recorded in management information 60a. In this way, the session end position is recorded in management information 60a; thus, the session is closed.

Thereafter, in the case of adding new data, last session end position P1 is recognized with reference to management information 60a and, as illustrated in FIG. 6B, new management information 60b is recorded in the area continuing from last session end position P1, and user data 50b is recorded following management information 60b. When recording of user data 50b is completed, information indicating new session end position P2 is recorded in management information 60b. Thus, the new session is closed.

In this way, the management information and the user data are sequentially recorded every time data is added (or updated). Thus, the management information and the data are recorded in each session. At this time, information in the volume descriptor of the last session is merged with volume descriptor 62 of the latest session. Information in path table 63 and directory record 64 of the last session is also merged with the latest information. A file is accessed with reference to volume descriptor 62, path table 63, and directory record 64 all recorded in the latest session. Information indicating the lead position, that is, the starting address, of the latest session is recorded in a predetermined area on the inner perimeter or the outer perimeter of optical disc 101. By referring to this information, it is possible to recognize the lead position of the latest session.

[1-2-2. Synchronization Process]

In the case of adding a new file or rewriting (updating) a part of a file on optical disc 101 according to the command from client apparatus 10, information recording system 100 first records, onto cache 34, data to be added or update data (hereinafter referred to as "synchronization data") before adding, etc., the file to optical disc 101.

In other words, cache 34 stores synchronization data which is data to be added and/or an update data portion that have been received from client apparatus 10. Thereafter, according to the command received from client apparatus 10, file addition or update is performed using the synchronization data on cache 34. The file on cache 34 is managed according to virtual management information 35.

Controller 21 performs a process of reflecting, in optical disc 101, the state of virtual management information 35 and the data on cache 34. Furthermore, management information 37 is updated so that the management state of the updated file is managed. A series of these processes is called "the synchronization process". Through the synchronization process, the state of the file (data) stored on cache 34 which is managed according to virtual management information 35 is reflected in the physical data recorded on optical disc 101. Optical disc 101 is placed in the state where the file addition, update, or the like has been performed according to the command from client apparatus 10. After the synchronization process, controller 21 causes storage apparatus 40 to modify (specifically, physically erase) the file (data) to be eased on optical disc 101 into the state where the data is unreadable.

In this way, when receiving the command from client apparatus 10, information recording system 100 performs data update or the like on cache 34 first. Subsequently, the synchronization process is performed on optical disc 101 so that the content on cache 34 is reflected in optical disc 101. Thus, even when more than one command is received and the data on cache 34 is updated more than one time, processes corresponding to more than one command can be reflected in optical disc 101 through one synchronization process. Accordingly, the frequency of loading optical disc 101 into optical disc drive 46 can be reduced, and the efficiency of the process of recording onto optical disc 101 can be increased. In particular, when the number of optical discs 101 on which data may be recorded is large relative to the number of optical discs on which data can be simultaneously written by optical disc drive 46, the frequency of loading optical disc 101 into optical disc drive 46 is reduced.

[1-2-3. File Update]

With reference to the flowchart in FIG. 7, the flow of a file update process in information recording apparatus 20 upon reception of an update command will be described.

Controller 21 in information recording apparatus 20 receives an update command from client apparatus 10 (S11). In the update command, the file name of a file to be updated, the position of data to be updated, the length of the data to be updated, and the data to be updated are designated. Controller 21 updates cache 34 and virtual management information 35 by updating the file according to the update command (S12, S13). Specifically, controller 21 adds, to cache 34, the new file updated according to the update command (S12). When the update is performed, the file before the update is deleted, and the file after the update is recorded on the disc, in an area different from where the file before the update is located. Therefore, controller 21 updates virtual management information 35 so that virtual management information 35 indicates the state of the file after the update (S13).

Subsequently, the synchronization process (S14) is performed to synthesize (match) the logical state of optical disc 101 which is managed according to virtual management information 35 and the actual physical state of optical disc 101. The file update is reflected in optical disc 101 through the synchronization process. The synchronization process may be performed at the timing freely designated by a user or may be performed sequentially after an update-related process on virtual management information 35 or may be performed at a preset point in time by the function of scheduler 38.

Processes on optical disc 101 upon the file update through the synchronization process will be described. Since optical disc 101 is a recordable optical disc, data that has been once recorded on optical disc 101 cannot be updated (rewritten) in the same physical position on the disc. Thus, upon the file update, a file is recorded onto optical disc 101 as follows.

With reference to FIGS. 8A and 8B, the processes performed on optical disc 101 upon updating (rewriting) the file already recorded in a user data area of optical disc 101 (hereinafter referred to as a "subject file") will be described in detail.

Assume that as illustrated in FIG. 8A, management information 60*a* and user data 50*a* have already been recorded in the data area of optical disc 101. The case where user data 50*a* includes data of a plurality of files and one file 51*a* among them is updated will be described as an example.

In the case of updating file 51*a*, as illustrated in FIG. 8B, management information 60*b* for managing the state of a file on optical disc 101 after file update and data of updated file 51*b* generated by updating file 51*a* are recorded in the free space in the data area of optical disc 101.

Specifically, updated file 51*b* is generated by updating (rewriting) file 51*a* according to the update command. This updated file 51*b* is recorded at a location different from where original file 51*a* before the update is recorded. Accordingly, the content of management information 60*a* for managing files on optical disc 101 is rewritten, and new management information 60*b* is generated. New management information 60*b* is recorded in the area continuing from last session end position P1. Subsequently, updated file 51*b* is recorded following management information 60*b*.

Note that since original file 51*a* for updated file 51*b* is erased, management information 60*b* is generated in such a way as to manage the state after original file 51 has been erased.

In this way, new entity data of the updated file is recorded on optical disc 101.

[1-2-4. File Erasure]

Figure 9:
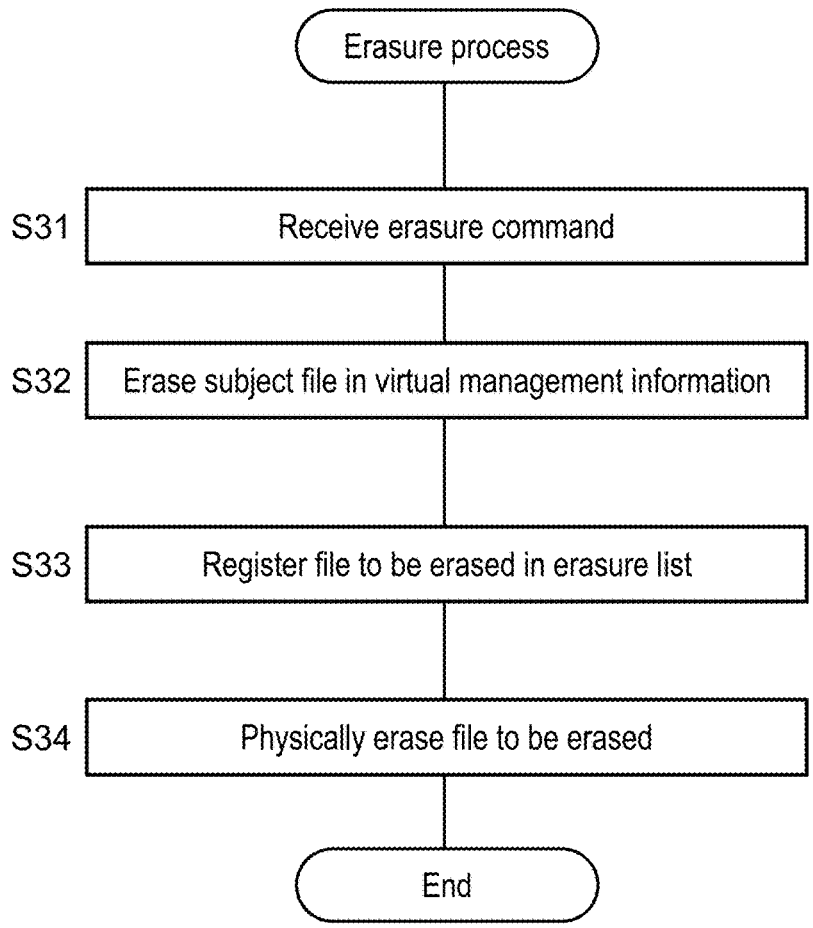
FIG. 9 is a flowchart showing a process of erasing a file.

With reference to FIG. 9, file erasure by information recording system 100 will be described. FIG. 9 is a flowchart showing the flow of logical file erasure.

When receiving an erasure command from client apparatus 10 (S31), information recording apparatus 20 in information recording system 100 logically erases the file to be erased. Specifically, controller 21 erases the file on virtual management information 35 (S32) and registers the file to be erased in erasure list 33 (S33). Thus, the file to be erased is logically erased. Mere logical erasure of the file means that the entity data of the file is still effectively present on optical disc 101 and thus, the data of said file can be reproduced (read).

Subsequently, controller 21 identifies the file to be erased with reference to erasure list 33, and physically erases the identified file (S34). The physical erasure means rewriting the data of the file to be erased so that the file is physically unreadable. The data of the erased file cannot be reproduced (read) after the physical erasure.

As described above, when the erasure command is received, the file to be erased is erased in virtual management information 35 and is registered in erasure list 33. In this state, the file to be erased is merely logically erased in virtual management information 35; the content of the file can be read. Subsequently, controller 21 physically erases the file to be erased which has been registered in erasure list 33. Thus, the data of the file is physically erased (made unreadable).

Figure 10:
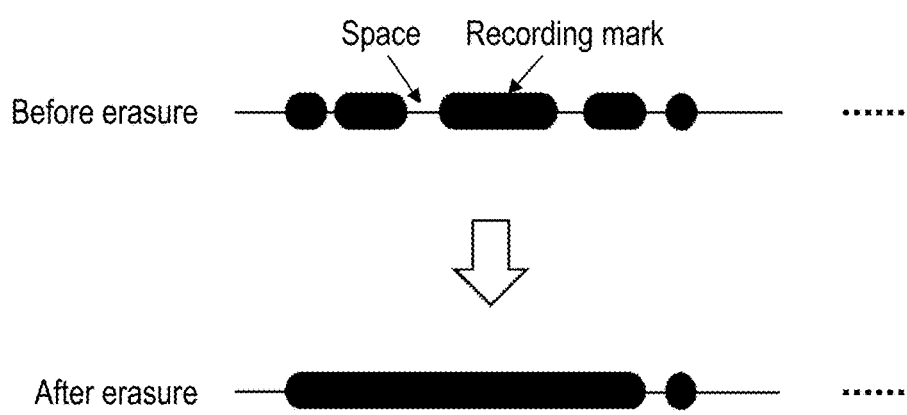
FIG. 10 illustrates physical erasure of data in a recording layer of a recordable optical disc.

The physical erasure is achieved by placing the file to be erased in an unreadable state. For example, at least part of the data of the file to be erased is rewritten with a predetermined erasure pattern to make the file unreadable. Specifically, the file to be erased is made unreadable by rewriting at least one of the entity data of the file to be erased, the synchronization data, and data for error correction with the predetermined erasure pattern. Rewriting is performed, for example, by deforming, in the recording layer of optical disc 101, a recording mark included in the data of the file to be erased so that an elongated recording mark is used, as illustrated in FIG. 10. As a result of deformation of the recording mark, the file is unreadable afterward, which substantially means that the file has been physically erased.

The timing for the physical erasure may be freely designated by a user or may be scheduled in advance or may be in parallel with the synchronization process.

[1-2-5. Physical Erasure Associated with Synchronization Process]

Figure 11:
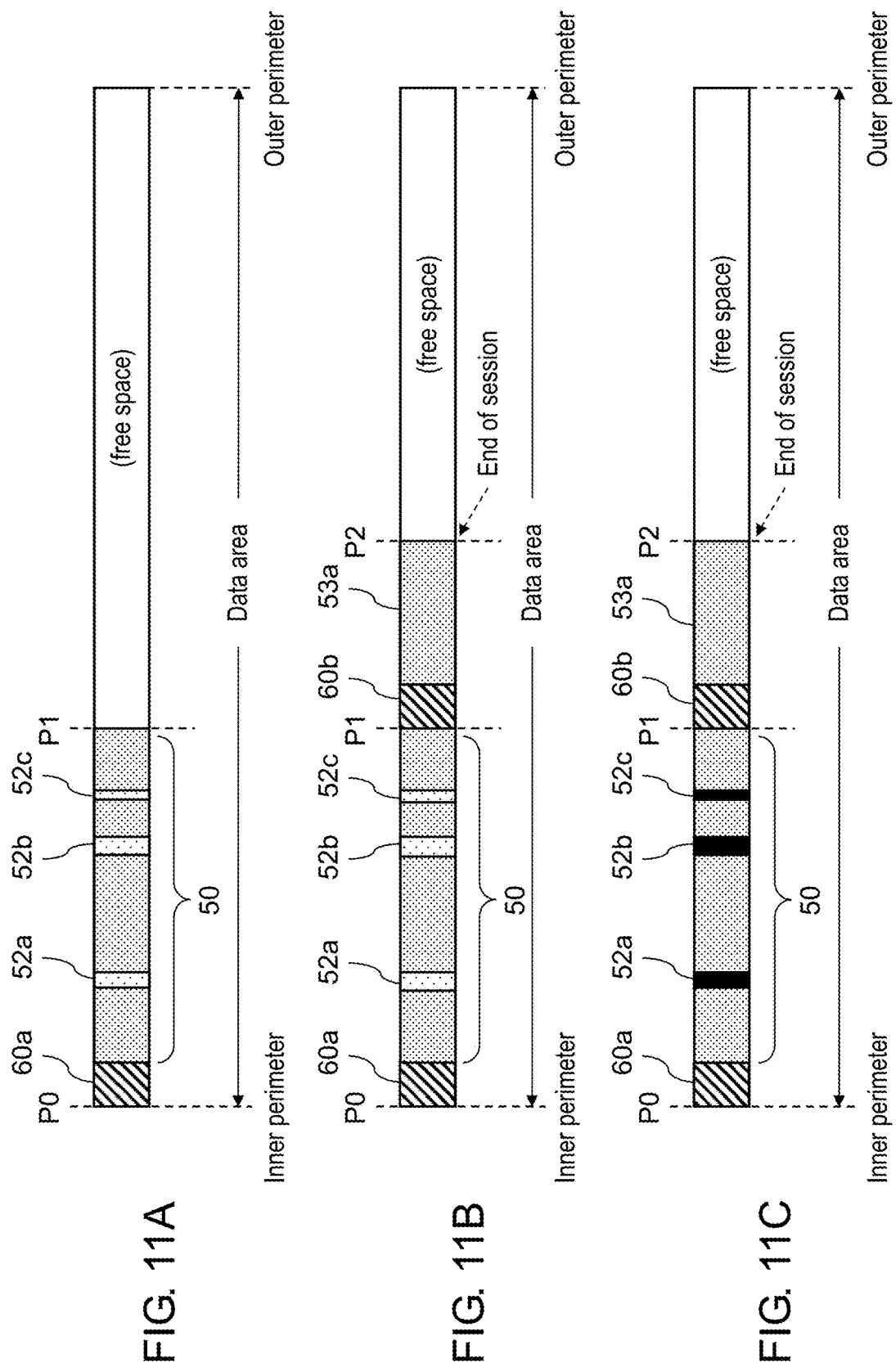
FIG. 11A illustrates the state of an optical disc before a synchronization process.
FIG. 11B illustrates the state of an optical disc when a session is closed in a synchronization process.
FIG. 11C illustrates the state where user data on an optical disc has been physically erased in a synchronization process including file erasure.

Hereinafter, physical file erasure in the case where the synchronization process is performed at the scheduled timing will be described. FIG. 11A to FIG. 11C illustrate the physical file erasure in the case where the synchronization process is performed at the scheduled timing. Assume that as illustrated in FIG. 11A, files 52a, 52b, and 52c have been logically erased as the files to be erased. Specifically, this is a situation in which although the state of files 52a, 52b, and 52c managed according to virtual management information 35 indicates that these files have been erased, the physical data on optical disc 101 have not been erased. When the synchronization process is performed in this situation, synchronization data 53a is added so that the state of the files managed according to virtual management information 35 is reflected in optical disc 101. Thus, prior to recording of synchronization data 53a, management information 60b for managing the new file state is added. Management information 60b is for managing the state of optical disc 101 after files 52a, 52b, and 52c have been erased and synchronization data 53a have been reflected. Subsequently, when files 52a, 52b, and 52c are physically erased on optical disc 101, the data of files 52a, 52b, and 52c are made unreadable on optical disc 101.

Figure 12:
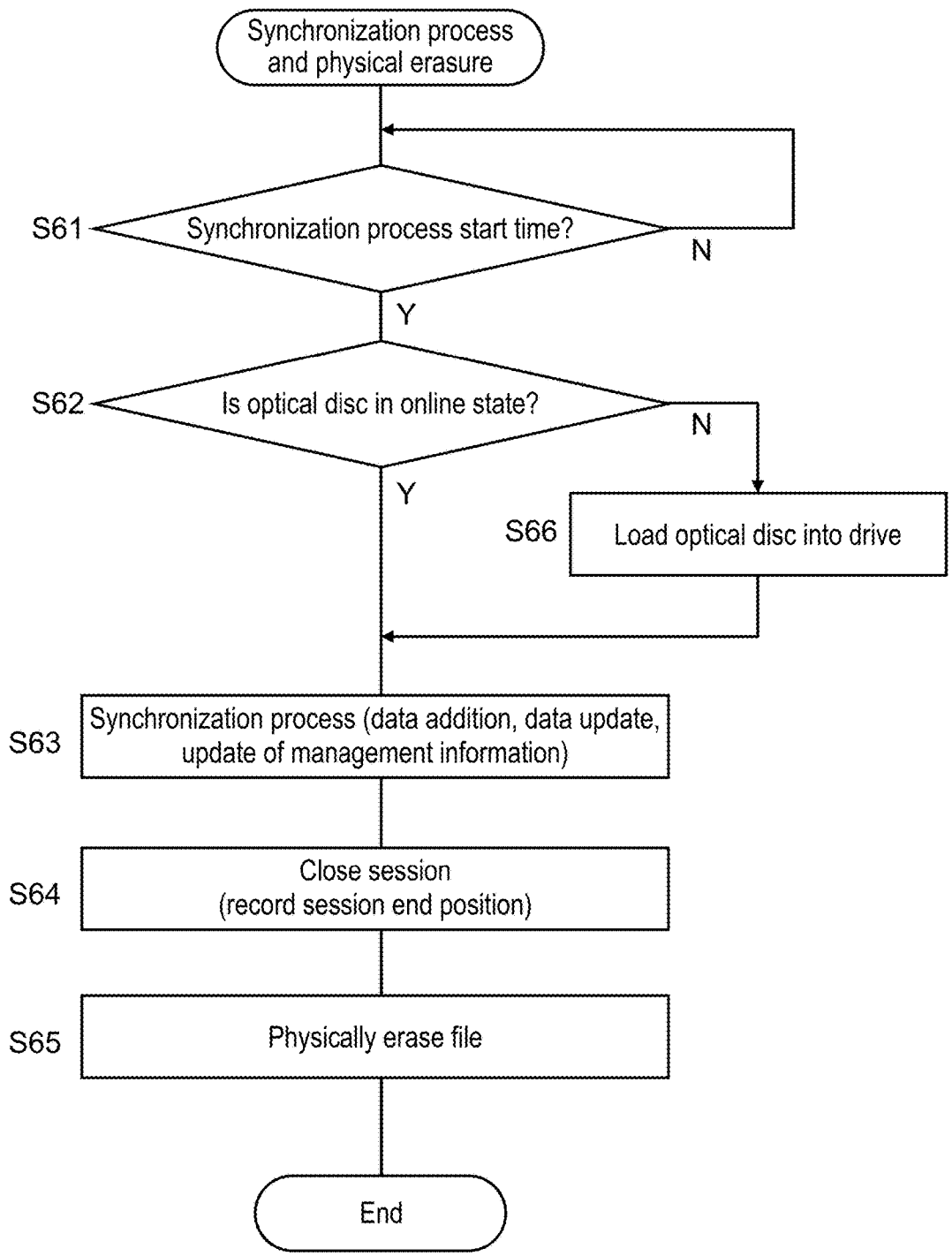
FIG. 12 is a flowchart showing a scheduled synchronization process and a physical erasure process that is performed in association with the scheduled synchronization process.

FIG. 12 is a flowchart showing the synchronization process which is performed at the scheduled timing and the physical erasure associated with the synchronization process. Hereinafter, the synchronization process which is performed at the scheduled timing and the physical erasure which is performed in association with the synchronization process will be described with reference to FIG. 12.

Controller 21 determines, by the function of scheduler 38, whether or not the current time has reached a point in time at which the synchronization process starts (S61). When determining that the current time has reached the synchronization process start time (S61), controllers 21 starts the synchronization process.

First, controller 21 checks with storage apparatus 40 whether or not optical disc 101 is in the online state (in other words, whether or not optical disc 101 has been loaded in optical disc drive 46) (S62). When optical disc 101 is not in the online state, controller 21 instructs storage apparatus 40 to load optical disc 101 into optical disc drive 46 (S66).

Subsequently, controller 21 performs the synchronization process on optical disc 101 according to virtual management information 35 and cache 34 (S63). In the synchronization process, controller 21 adds, modifies, etc., a file (entity data), management information, or the like on optical disc 101 so that the state of the data which is managed according to virtual management information 35 is reflected in optical disc 101. For example, as illustrated in FIG. 11B, management information 60b for managing the state after the synchronization is newly recorded onto optical disc 101.

After the end of the synchronization process, controller 21 closes the session (S64). When the session is closed, the session end position, that is, the position of the terminal end of the area in which the data has been recorded on optical disc 101 (for example, position P2 in FIG. 11B) is fixed. Controller 21 instructs storage apparatus 40 to record, in the management information (for example, management information 60b), information indicating the session end position. Thus, the information indicating the session end position is recorded in the management information. Upon recording data onto optical disc 101 next, the data recording start position of the next session can be identified with reference to the information indicating session end position P2 recorded in management information 60b.

As described earlier, regarding the file erasure, when the synchronization process is performed and the content of virtual management information 35 is reflected, the file to be erased is merely logically erased (files 52a, 52b, and 52c in FIG. 11B). Thus, after the session is closed, controller 21 physically erases the file to be erased (S65). Specifically, with reference to erasure list 33, controller 21 searches for the file to be erased and instructs storage apparatus 40 to physically erase the file (S65). According to the instruction from controller 21 in information recording apparatus 20, controller 42 in storage apparatus 40 physically erases, on optical disc 101, the file indicated in the instruction (files 52a, 52b, and 52c in FIG. 11C). The physically erased file is unreadable.

If the physical erasure is performed before the session is closed, the following problem may arise. When the physical erasure fails to be normally completed due to a device trouble or the like during the physical erasure, the session cannot be closed, and the information of the session end position is not recorded in the management information. Therefore, the session end position cannot be recognized; thus, no data can be added to optical disc 101 afterward though data reading (reproduction) is possible. In contrast, when the physical erasure is performed after the session is closed as in the present exemplary embodiment, the information of the session end position is recorded in the management information before the physical erasure. Therefore, even when the physical erasure fails to be normally completed, the information of the session end position can be read from the management information; thus, subsequent data reading and addition are possible.

In the present exemplary embodiment, the physical erasure is performed in association with the synchronization process as described above. Thus, in the state where optical disc 101 is loaded in optical disc drive 46 for the synchronization process, the physical exposure can be continuously performed. Therefore, it is not necessary to load optical disc 101 separately for the erasure process, and thus the waiting time for loading, the loading frequency, etc., can be reduced; the efficiency of the process of updating optical disc 101 can be improved as a whole.

[1-3. Advantageous Effects, Etc.]

As described above, information recording apparatus 20 according to the present exemplary embodiment is capable of erasing a file (that is, user data) recorded on recordable optical disc 101. Information recording apparatus 20 includes: cache 34 or data memory 22 (an example of the first memory) which stores synchronization data (34) for updating user data on optical disc 101 and/or adding user data to optical disc 101; data memory 22 (an example of the second memory) which stores erasure list 33 (an example of the erasure information) indicating user data to be erased; and controller 23 (an example of the controller) which controls addition, update, and erasure of user data on optical disc 101. Controller 21 records the synchronization data onto optical disc 101. After recording the synchronization data, controller 21 records, onto optical disc 101, management information 60a, 60b indicating the state of optical disc 101 on which the synchronization data has been recorded and the state of optical disc 101 resulting from erasure according to erasure list 33 (S63). Subsequently, controller 21 closes the session (S64). After closing the session, controller 21 physically erases the data to be erased which has been recorded on optical disc 101 (S65). Furthermore, controller 21 erases the synchronization data stored in cache 34 or data memory 22 (an example of the first memory).

In the present exemplary embodiment, the data to be erased is physically erased after the session is closed. Thus, even when the physical erasure is interrupted due to malfunctioning of information recording apparatus 20 during the physical erasure of the data to be erased, since the closure of the session has been completed, recording and reproduction on the optical disc continue to be possible afterward.

When the session is closed, controller 21 may record, in management information 60a, 60b on optical disc 101, the information indicating the position (P1, P2) of the terminal end of the data recorded area on optical disc 101. Thus, even when the physical erasure is interrupted due to malfunctioning of information recording apparatus 20 during the physical erasure of the data to be erased, the position of the terminal end of the data recorded area on optical disc 101 can be recognized with reference to management information 60a, 60b.

Management information 60a, 60b may be for managing, in compliance with the ISO 9660 standard, the data recorded on optical disc 101.

FIG. 13A to FIG. 13G illustrate an example of the operation in which information recording apparatus 20 modifies the user data on optical disc 101.

Figure 13A:
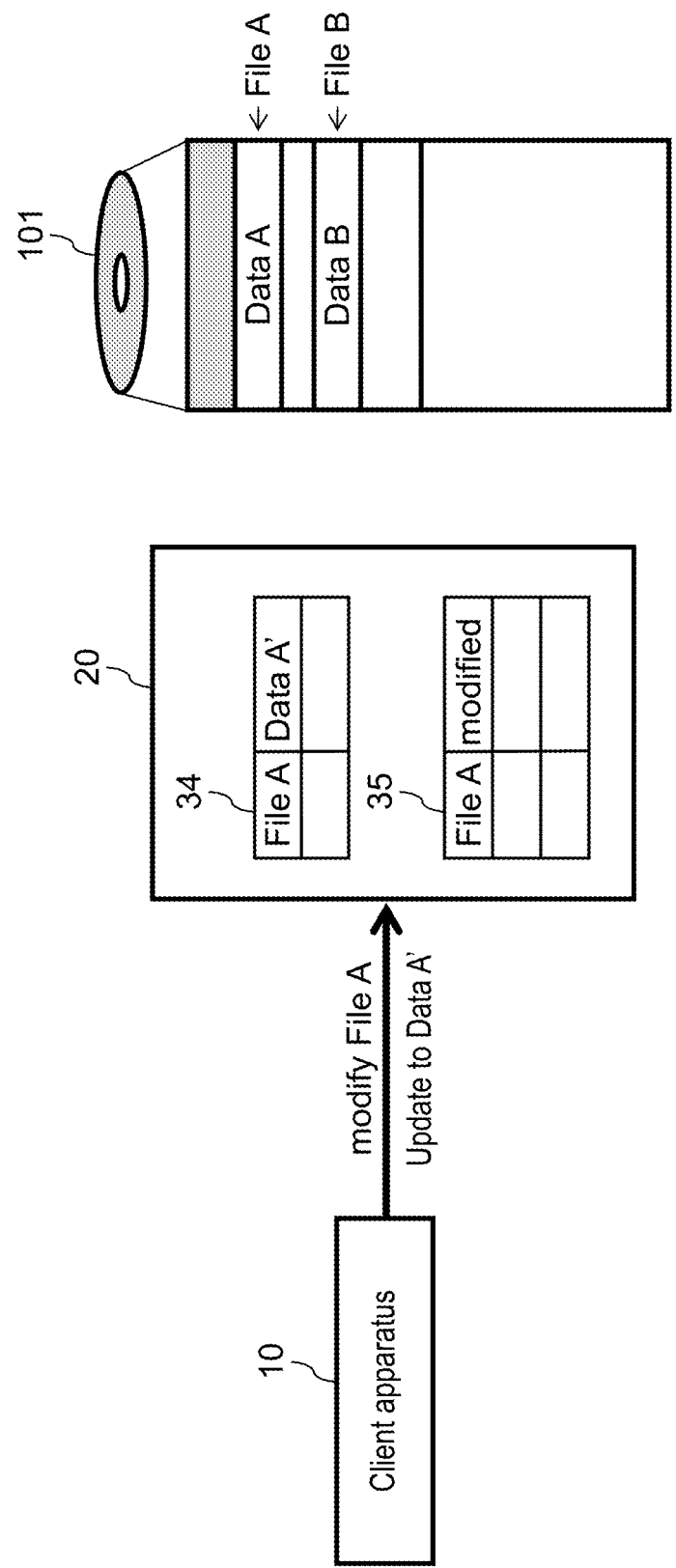
FIG. 13A illustrates an example of an operation responding to input for updating user data.

Assume that in FIG. 13A, client apparatus 10 provides, to information recording apparatus 20, input for updating Data A, which is user data of File A recorded on optical disc 101, to Data A'. Information recording apparatus 20 temporarily holds, in cache 34, Data A' as synchronization data corresponding to File A. When generating Data A' to be held in cache 34, information recording apparatus 20 may use Data A, which is data read from optical disc 101. Furthermore, information recording apparatus 20 manages the state of File A using virtual management information 35.

Figure 13B:
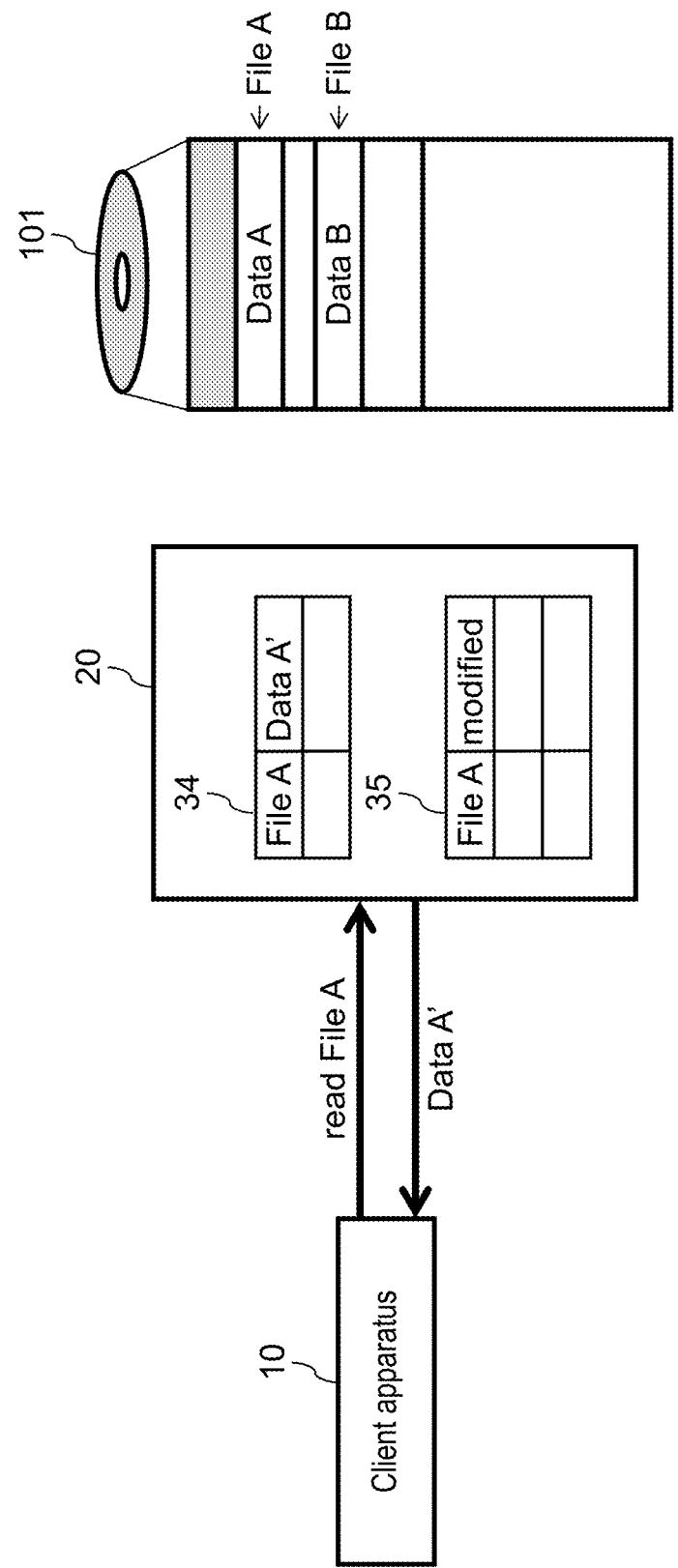
FIG. 13B illustrates an example of an operation responding to input for reading user data.

FIG. 13B illustrates the operation in which, after the input in FIG. 13A, client apparatus 10 provides input for reading File A to information recording apparatus 20. Information recording apparatus 20 transfers, to client apparatus 10, data corresponding to File A, on the basis of the synchronization data held in cache 34, which is Data A', with reference to virtual management information 35. Thus, even in the state where the user data corresponding to File A on optical disc 101 has not yet been updated to Data A', client apparatus 10 can obtain Data A' as the user data corresponding to File A.

Figure 13C:
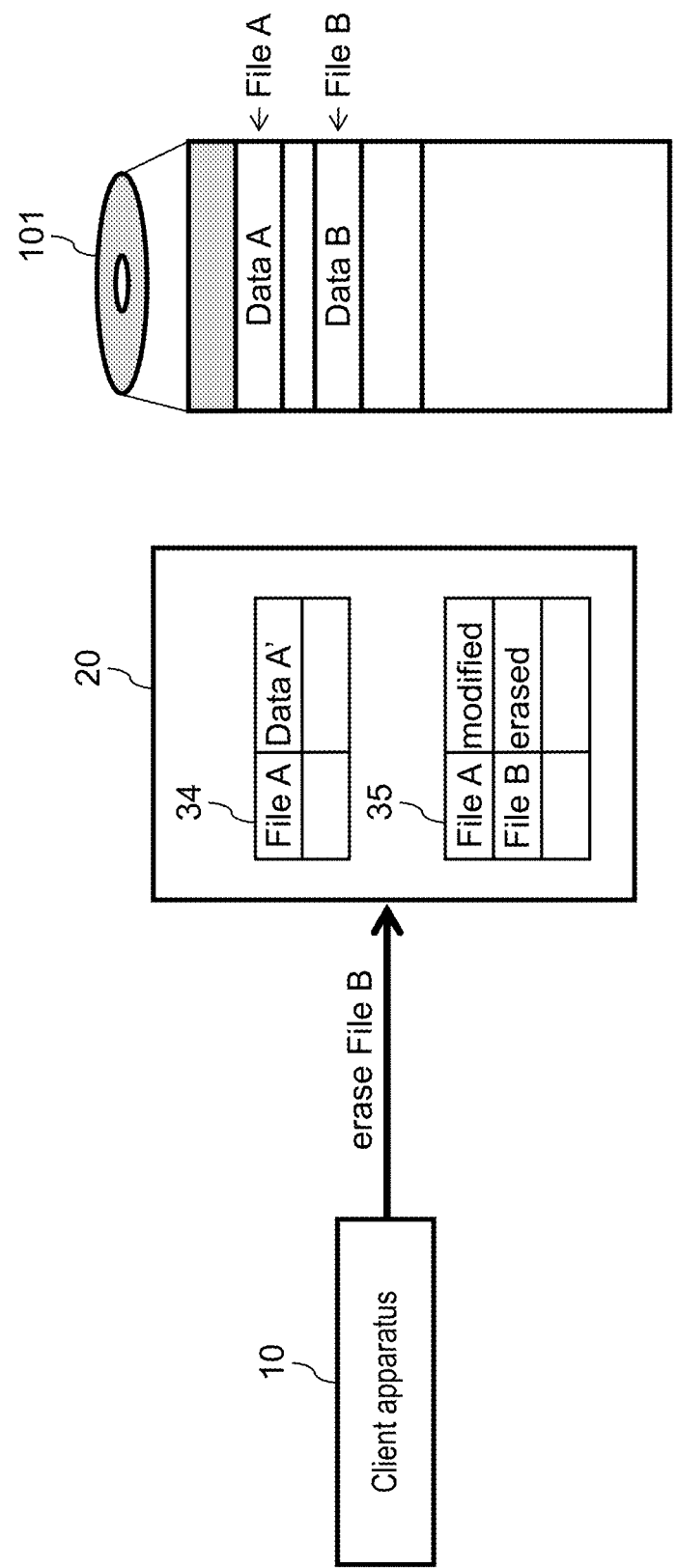
FIG. 13C illustrates an example of an operation responding to input for deleting user data.

FIG. 13C illustrates an example of the operation in which client apparatus 10 provides input for deleting File B to information recording apparatus 20. Virtual management information 35 is for managing information indicating that File B on the optical disc has been deleted. For example, when client apparatus 10 provides input for reading File B to information recording apparatus 20, information recording apparatus 20 notifies client apparatus 10 that File B is unreadable on optical disc 101. Thus, even in the state where File B on optical disc 101 has not been physically erased, information recording apparatus 20 can perform substantially the same operation as in the case where File B has been deleted.

FIG. 13D illustrates the operation performed when client apparatus 10 provides, to information recording apparatus 20, input for updating the user data corresponding to File A from Data A' to Data A". With reference to virtual management information 35, information recording apparatus 20 confirms that cache 34 is holding the synchronization data corresponding to File A. Information recording apparatus 20 updates Data A', which is the synchronization data held in cache 34 that corresponds to File A, to Data A". Thus, information recording apparatus 20 can virtually update File A without accessing optical disc 101.

Figure 13E:
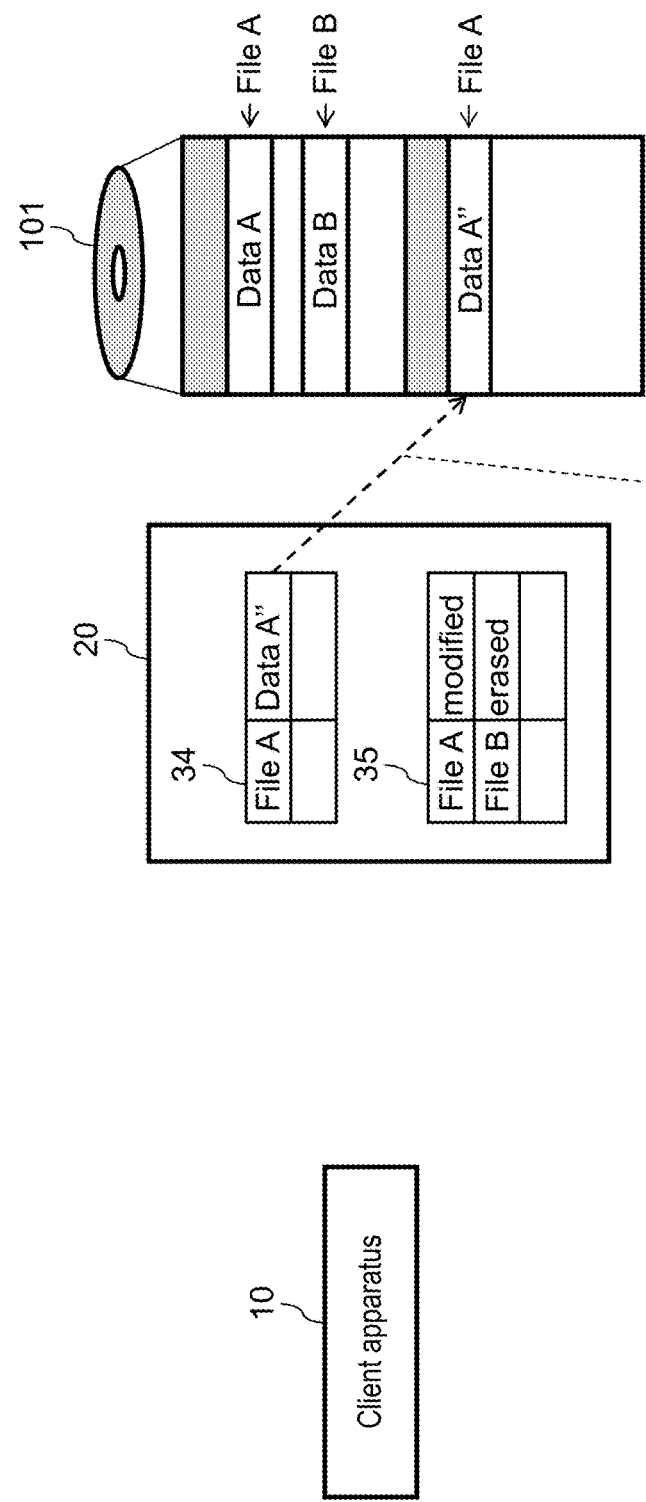
FIG. 13E illustrates an operation associated with a synchronization process.
Figure 13F:
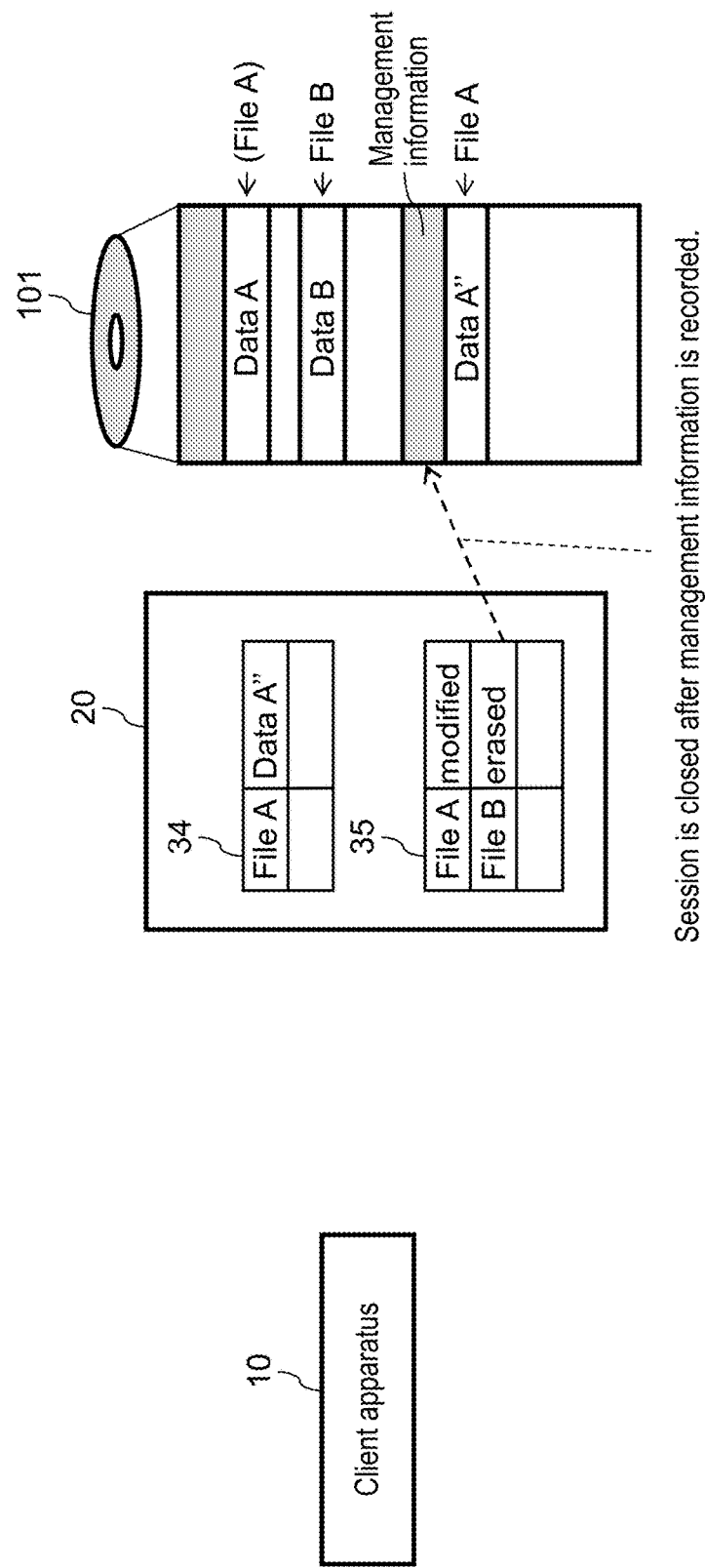
FIG. 13F illustrates an operation associated with a synchronization process.

FIG. 13E, FIG. 13F, and FIG. 13G illustrate the operation in which information recording apparatus 20 performs the synchronization process and the physical erasure on optical disc 101.

As illustrated in FIG. 13E, information recording apparatus 20 opens a session for writing information onto optical disc 101. With reference to virtual management information 35, information recording apparatus 20 records, onto optical disc 101, the synchronization data after update held in cache 34. For example, Data A", which is the user data corresponding to File A, is recorded onto optical disc 101.

As illustrated in FIG. 13F, information recording apparatus 20 records the management information onto optical disc 101 with reference to virtual management information 35. The management information includes information indicating the position of File A after update and information indicating that File B is not referable. After recording the management information onto optical disc 101, information recording apparatus 20 closes the session. Thus, even in the state where the user data on optical disc 101 has not been physically erased, when optical disc 101 is reproduced by an ordinary method, update of the user data can be assumed to have been completed. This means that even if some failure occurs after the session is closed, it is possible to avoid damage to the logical data on optical disc 101.

In FIG. 13G, data on optical disc 101 is physically erased with reference to erasure list 33. Specifically, data on optical disc 101 that has been logically erased, but has not been physically erased is physically erased. Consequently, it becomes difficult to reproduce the erased information and the user data before update even when an unordinary method is used in an attempt to reproduce the data on optical disc 101.

After closing the session in FIG. 13F, information recording apparatus 20 erases synchronization data that has been recorded on optical disc 101 among the synchronization data held in cache 34 (FIG. 13G).

Figure 7:
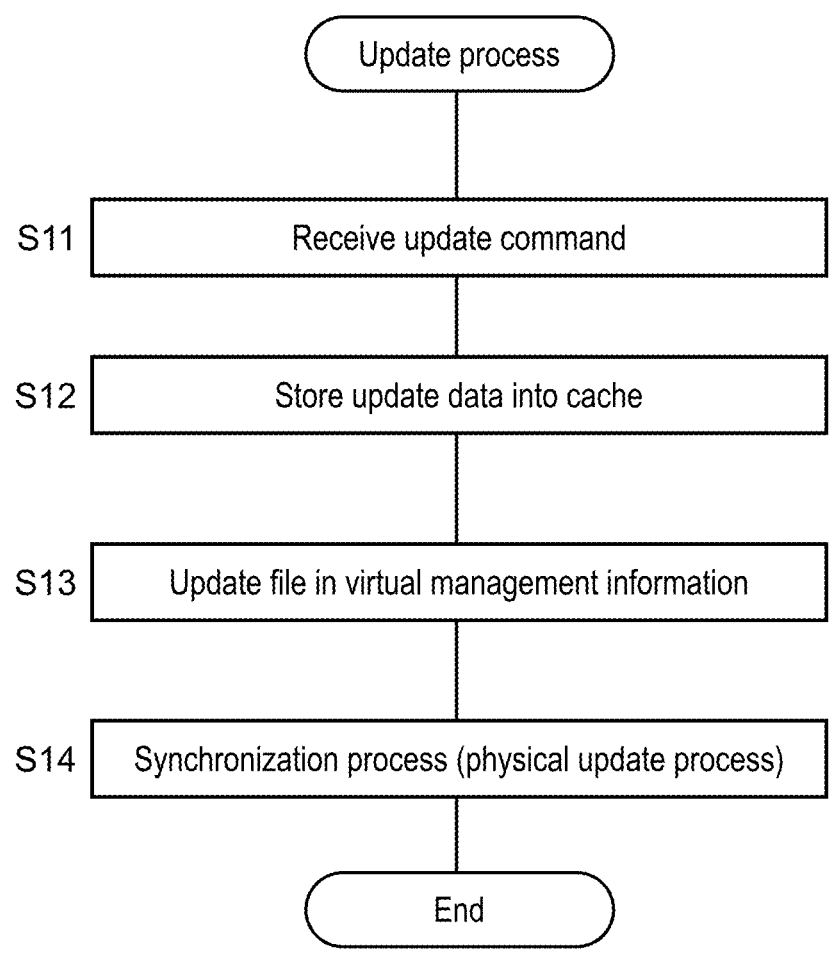
FIG. 7 is a flowchart showing a process of updating a file.

As described above, information recording apparatus 20 according to the flowcharts in FIG. 7 and FIG. 12 is capable of reducing the possibility of damage to the logical data on optical disc 101 due to a failure occurring during physical erasure of the data on optical disc 101.

Other Exemplary Embodiments

The first exemplary embodiment has been described above by way of example of techniques disclosed in the present application. The techniques according to the present disclosure, however, are not limited to the foregoing exemplary embodiment, and can also be applied to exemplary embodiments obtained by carrying out modification, substitution, addition, omission, etc. Furthermore, it is also possible to obtain a new embodiment by combining respective structural elements described in the above first exemplary embodiment.

In the above-described exemplary embodiments, the physical file erasure is performed at the time of execution of the synchronization process, but the physical erasure may be performed independently of the synchronization process. In other words, the physical erasure may be performed at any timing, i.e., not in association with the synchronization process.

In the above-described exemplary embodiments, the file system complying with the ISO 9660 standard is used as the management information for optical disc 101, but the management information may be another file system. For example, the universal disk format (UDF) may be used.

In the above-described exemplary embodiments, erasure list 33 is used as the erasure information, the erasure information is not limited to erasure list 33. Any information with which the file to be erased can be identified may be used as the erasure information.

In the above exemplary embodiments, controllers 21 and 52 are described as CPUs or MPUs which provide the predetermined functions in cooperation with software. However, dedicated electronic circuits designed to provide the predetermined functions may be used as controllers 21 and 52. Specifically, CPUs, MPUs, digital signal processors (DSPs), field-programmable gate arrays (FPGAs), application-specific integrated circuits (ASICs), and the like can be used as controllers 21 and 52.

In the above exemplary embodiments, storage apparatus 40 including only one optical disc 101 is described in order to simplify description, but storage apparatus 40 may be configured to store more than one optical disc and switch, by changer 44, the optical disc to be loaded into optical disc drive 46.

Furthermore, in the above-described exemplary embodiments, the data to be erased is exemplified by a file, but an object that has been increasingly used in Swift or the like may become the subject to be erased.

The exemplary embodiments have been described above by way of example of techniques of the present disclosure. To this extent, the accompanying drawings and detailed description are provided.

Thus, the structural elements set forth in the accompanying drawings and detailed description may include not only structural elements essential to solve the problems but also structural elements unnecessary to solve the problems for the purpose of illustrating the above techniques. Thus, those unnecessary structural elements should not be deemed essential due to the mere fact that they appear in the accompanying drawings and the detailed description.

The above-described exemplary embodiments illustrate the techniques of the present disclosure, and thus various modifications, substitutions, additions, omissions, etc., are possible in the scope of the appended claims and the equivalents thereof.

The present disclosure is applicable to an apparatus capable of erasing data from a recordable optical disc.

What is claimed is:

1. An information recording apparatus capable of erasing user data recorded on an optical disc that is recordable, the information recording apparatus comprising:
   a first memory which stores synchronization data for updating user data on the optical disc and/or adding user data to the optical disc;
   a second memory which stores erasure information indicating user data to be erased; and
   a controller which controls addition, update, and erasure of user data on the optical disc, wherein
   the controller records the synchronization data onto the optical disc,
   after recording the synchronization data, the controller records, onto the optical disc, management information indicating a state of the optical disc on which the synchronization data has been recorded and a state of the optical disc resulting from erasure according to the erasure information,
   subsequently, the controller closes a session, and
   after closing the session, the controller erases the synchronization data stored in the first memory, and physically erases user data to be erased which has been recorded on the optical disc.

2. The information recording apparatus according to claim 1, wherein
   when the session is closed, the controller records, into the management information on the optical disc, information indicating a position of a terminal end of a data recorded area on the optical disc.

3. The information recording apparatus according to claim 1, wherein
   the management information is for managing, in compliance with an ISO 9660 standard, user data recorded on the optical disc.

4. A data erasure method for erasing user data recorded on an optical disc that is recordable, the data erasure method comprising:
   generating synchronization data for updating user data on the optical disc and/or adding user data to the optical disc;
   generating erasure information indicating user data to be erased;
   recording the synchronization data onto the optical disc;
   recording management information onto the optical disc after recording the synchronization data, the management information indicating a state of the optical disc on which the synchronization data has been recorded and a state of the optical disc resulting from erasure according to the erasure information;
   subsequently closing a session; and after closing the session, physically erasing user data to be erased which has been recorded on the optical disc.

5. The data erasure method according to claim 4, wherein when the session is closed, information indicating a position of a terminal end of a data recorded area on the optical disc is recorded into the management information on the optical disc.

6. The data erasure method according to claim 4, wherein the management information is for managing, in compliance with an ISO 9660 standard, user data recorded on the optical disc.

* * * * *